US008436822B2

(12) United States Patent
Chang et al.

(10) Patent No.: US 8,436,822 B2
(45) Date of Patent: May 7, 2013

(54) TOUCH PANEL (75) Inventors: Yaw-Guang Chang, Tainan County (TW); Chin-Feng Hsu, Tainan County (TW)

(73) Assignee: Himax Technologies Limited, Tainan (TW)

(*) Notice: Subject to any disclaimer, the term of this patent is extended or adjusted under 35 U.S.C. 154(b) by 806 days.

(21) Appl. No.: 12/643,585

(22) Filed: Dec. 21, 2009

(65) Prior Publication Data
US 2010/0326744 A1 Dec. 30, 2010

Related U.S. Application Data (60) Provisional application No. 61/219,771, filed on Jun. 24, 2009.

(51) Int. Cl.
*G06F 3/044* (2006.01)
(52) U.S. Cl.
USPC ............. 345/173; 345/55; 345/66; 178/18.05

(58) Field of Classification Search ............... 178/18.05; 345/173, 66, 55
See application file for complete search history.

(56) References Cited

U.S. PATENT DOCUMENTS 7,839,392 B2 * 11/2010 Pak et al. ................. 345/173
2005/0104867 A1 * 5/2005 Westerman et al. ...... 345/173
2010/0073317 A1 * 3/2010 Hasegawa ................ 345/174

* cited by examiner

*Primary Examiner* — Joseph Feild
*Assistant Examiner* — Linh N Hoffner
(74) *Attorney, Agent, or Firm* — J.C. Patents (57) ABSTRACT

A touch panel has a panel capacitor, a first capacitor, and a second capacitor. The panel capacitor and the first capacitor are charged and discharged cyclically according to a first phase signal and a second phase signal, such that an input voltage associated with the panel capacitor and the first capacitor is applied to a control circuit. The control circuit charges and discharges a second capacitor based on the input voltage and a reference voltage to compensate the difference between the input voltage and the reference voltage. The capacitance of the panel capacitor could be calculated based on the frequency of charging and discharging the second capacitor.

19 Claims, 11 Drawing Sheets

TOUCH PANEL

CROSS-REFERENCE TO RELATED APPLICATION

This application claims the priority benefit of U.S. provisional application Ser. No. 61/219,771, filed on Jun. 24, 2009. The entirety of the above-mentioned patent application is hereby incorporated by reference herein and made a part of this specification.

BACKGROUND OF THE INVENTION

1. Field of Invention

The present invention is related to a touch panel, and more specifically, to a touch panel that determines the capacitance of a panel capacitor thereof based on the operations of three pairs of switches.

2. Description of Related Art

With the rapid development of technology, most electronic devices, such as notebook computers, mobile phones or portable multimedia players, usually have touch panels serving as input interfaces of a new generation in replacement of conventional keyboards. The touch panels are generally classified into capacitive and resistive touch panels. The capacitive touch panels are operated by approaching or touching the touch panels with a finger or a conductive material to change the capacitances of the touch panels. While variations in the capacitances are detected, the location approached or touched by the finger or the conductive material is determined, and an operation corresponding to the approached or touched location is performed.

Figure 1:
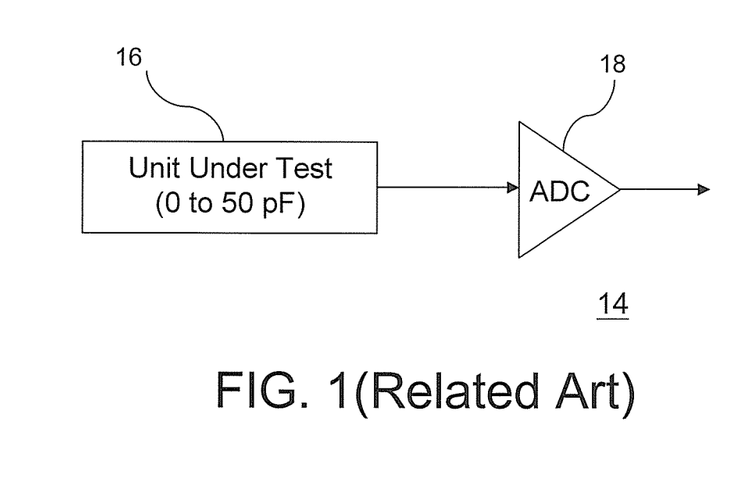
FIG. 1 is a functional block diagram of a conventional touch panel according to the related art.

FIG. 1 is a functional block diagram of a conventional touch panel 14 according to the related art. The touch panel 14 has a unit under test (UUT) 16 and an analog to digital converter (ADC) 18. The information of the capacitance of the UUT 16 is delivered to the ADC 18, such that the ADC 18 converts the capacitance of the UUT 16 into a digital form. The range of the capacitance of the UUT 16 is 0 to 50 pF (picofarad), and the ADC is a 16-bits converter. It is assumed that the capacitance of the UUT 16 is 25 pF when the UUT 16 is not touched, and that the capacitance of the UUT 16 is 25.1 pF when the UUT 16 is touched. In other words, the capacitance of the UUT 16 is changed from 25 pF to 25.1 pF, and the values of the corresponding digital codes outputted from ADC 18 are 32768 (i.e.

$$2^{16} \times \frac{25}{50}$$

) and 32899 (i.e.)

$$2^{16} \times \frac{25.1}{50}$$

) respectively. The difference between the values of the two digital codes is 131, which corresponds to the capacitance difference of 0.1 pF. It could be seen that the ADC 18 always converts the untouched capacitance of the UUT 16 (i.e. 25 pF) even if the capacitance difference of the UUT 16 is small, such that the ADC 18 always operates with high energy consumption.

SUMMARY OF THE INVENTION

The present invention provides a touch panel which has improved sensitivity for distinguishing the variations in the capacitance.

The present invention provides a touch panel. The touch panel comprises a first clock phase generator, a panel capacitor, a first capacitor, a second capacitor, a first switch, a second switch, a third switch, a fourth switch, a control circuit, a fifth switch, and a sixth switch. The first clock phase generator generates a first phase signal and a second phase signal according to a first clock signal. The first switch is turned on/off based on a voltage level of the first phase signal. A first end of the first switch is coupled to a first reference voltage, and a second end of the first switch is coupled to the panel capacitor. The second switch is turned on/off based on a voltage level of the second phase signal. A first end of the second switch is coupled to the panel capacitor. The third switch is turned on/off based on the voltage level of the first phase signal. A first end of the third switch is coupled to a second reference voltage, and a second end of the third switch is coupled to the first capacitor. The fourth switch is turned on/off based on the voltage level of the second phase signal. A first end of the fourth switch is coupled to the first capacitor, and a second end of the fourth switch is coupled to a second end of the second switch. The control circuit is coupled to the second end of the second switch and the second end of the fourth switch. The control circuit generates a third phase signal and a fourth phase signal based on a third reference voltage and a voltage level of the second end of the second switch. The fifth switch are turned on/off based on a voltage level of the third phase signal. A first end of the fifth switch is coupled to the second reference voltage, and a second end of the fifth switch is coupled to the second capacitor. The sixth switch is turned on/off based on a voltage level of the fourth phase signal. A first end of the sixth switch is coupled to the second capacitor, and a second end of the sixth switch is coupled to the second end of the second switch and the second end of the fourth switch.

According to an embodiment of the present invention, the second phase signal is at a second state when the first phase signal is at a first state, and the first phase signal is at the second state when the second phase signal is at the first state. The fourth phase signal is at the second state when the third phase signal is at the first state, and the third phase signal is at the second state when the fourth phase signal is at the first state.

According to an embodiment of the present invention, the control circuit comprises a logic operator. The logic operator generates the third phase signal and the fourth phase signal according to the first phase signal, the second phase signal, and a latched signal.

According to an embodiment of the present invention, the control circuit further comprises an integrator, an operational amplifier, and a latch circuit. The integrator outputs an integrated signal based on the third reference voltage and the voltage level of the second end of the second switch. A first input terminal of the integrator is coupled to the third reference voltage. A second input terminal of the integrator is coupled to the second end of the second switch, the second end of the fourth switch, and the second end of the sixth switch. The operational amplifier compares the third voltage with the integrated signal so as to output an amplified signal. A first input terminal of the operational amplifier is coupled to the third reference voltage, and a second input terminal of the operational amplifier is coupled to an output terminal of the integrator. The latch circuit is coupled to an output terminal of the operational amplifier. The latch circuit latches the amplified signal according to the first clock signal so as to output the latched signal to the logic operator.

According to an embodiment of the present invention, the control circuit further comprises a counter. The counter counts a number of pulses of the latched signal within a predetermined period, and the touch panel calculates the capacitance of the panel capacitor according to the number.

According to an embodiment of the present invention, the control circuit further comprises a signal processor. The signal processor selects a capacitor from a plurality of capacitors as the first capacitor based on the number.

According to an embodiment of the present invention, a voltage level of the integrated signal is greater than the third reference voltage when the voltage level of the second end of the second switch is less than the third reference voltage. The voltage level of the integrated signal is less than the third reference voltage when the voltage level of the second end of the second switch is greater than the third reference voltage.

According to an embodiment of the present invention, the latched signal is at a first state when the voltage level of the second end of the second switch is less than the third reference voltage. The latched signal is at a second state when the voltage level of the second end of the second switch is greater than the third reference voltage.

According to an embodiment of the present invention, when the latched signal is at the second state, the fifth switch and the sixth switch are turned off.

According to an embodiment of the present invention, only when the latched signal is at the first state, the fifth switch could be turned on by the third phase signal, and the sixth switch could be turned on by the fourth phase signal.

According to an embodiment of the present invention, the touch panel further comprises a second clock phase generator. The second clock phase generator generates a fifth phase signal and a sixth phase signal according to a second clock signal. When the fifth phase signal is at a first state, the sixth phase signal is at a second state. When the sixth phase signal is at the first state, the fifth phase signal is at the second state. The control circuit comprises a logic operator. The logic operator generates the third phase signal and the fourth phase signal according to the fifth phase signal, the sixth phase signal, and a latched signal.

According to an embodiment of the present invention, the frequency of the second clock signal is N times of a frequency of the first clock signal. N is an integer.

Accordingly, the difference between the capacitance of the panel capacitor and that of the first capacitor could be determined accurately according to the capacitance of the second capacitor and the number of the pulses of the latched signal within the predetermined period.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Descriptions of the present invention are given with reference to the embodiments illustrated with accompanied drawings wherein same or similar parts are denoted with same reference numerals.

Figure 2:
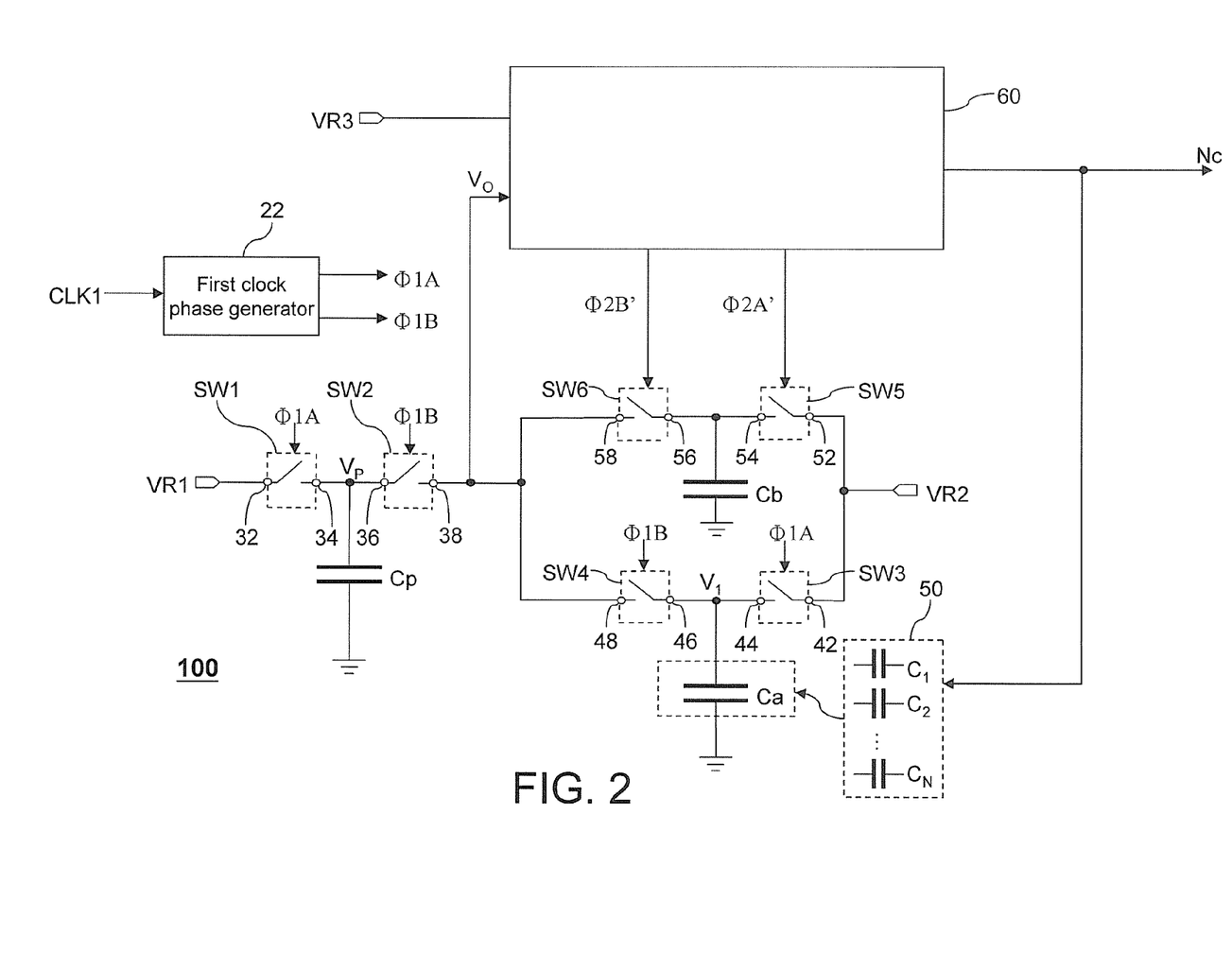
FIG. 2 is a functional block diagram of a touch panel of an embodiment of the present invention.

FIG. 2 is a functional block diagram of a touch panel 100 of an embodiment of the present invention. Referring to FIG. 2, in the embodiment, the touch panel 100 is integrated with a liquid crystal display (LCD). However, the present invention is not limited thereto. For example, the touch panel 100 also could be integrated with a plasma display, a cathode ray tube (CRT) display, or a light-emitting diode (LED) display. The touch panel 100 is used to provide information for identifying which part of the touch panel 100 be touched, such that a navigation signal for the operations of an electronic device (such as a personal computer, PDA, cell phone, etc.) could be generated. The touch panel 100 has a panel capacitor Cp, a first capacitor Ca, and a second capacitor Cb. The panel capacitor Cp represents one of capacitors of the liquid crystal display. In other words, the liquid crystal display may comprise a plurality of the panel capacitors Cp, which are arranged in an array. When the user touches the touch panel 100, the capacitance of the panel capacitor Cp is changed based on the degree of the touch force, such that the navigation signal would be generated based on the variations of the capacitance of the panel capacitor Cp.

Figure 3:
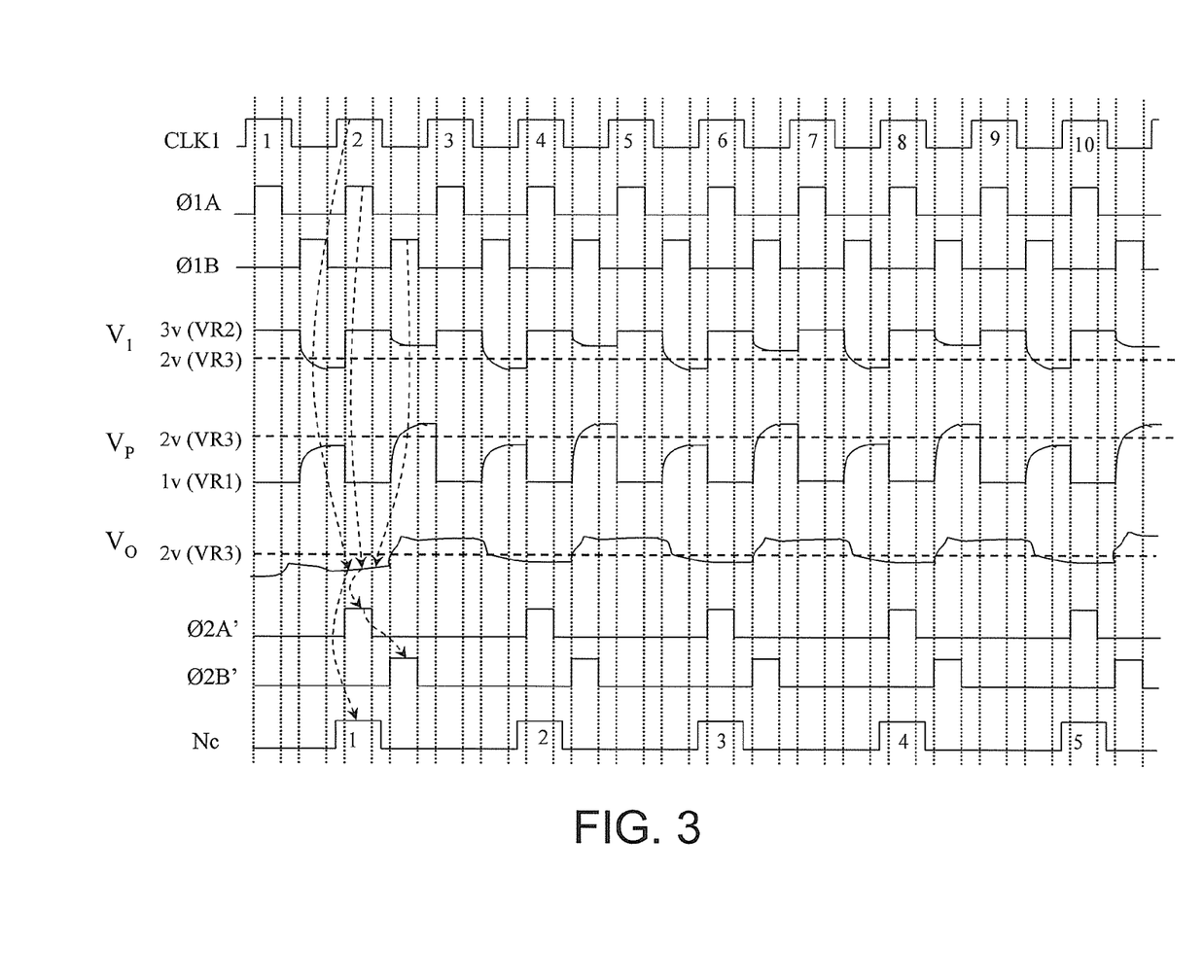
FIG. 3 is a timing diagram of signals of the touch panel shown in FIG. 2 while the capacitance of the panel capacitor Cp is 20.5 pF.

The touch panel 100 further comprises a first clock phase generator 22 and six switches SW1-SW6. The six switches SW1-SW6 are a first switch SW1, a second switch SW2, a third switch SW3, a fourth switch SW4, a fifth switch SW5, and a sixth switch SW6. The first clock phase generator 22 generates a first phase signal Ø1A and a second phase signal Ø1B according to a first clock signal CLK1. FIG. 3 is a timing diagram of signals of the touch panel 100. Referring to FIG. 3, the first clock signal CLK1 is a periodic signal. In the embodiment, the first phase signal Ø1A is high only when the first clock signal CLK1 is high. Each duration when the first phase signal Ø1A is high is less than one duration when the first clock signal CLK1 is high. In addition, the second phase signal Ø1B is high only when the first clock signal CLK1 is low. Each duration when the second phase signal Ø1B is high is less than one duration when the first clock signal CLK1 is low. As shown in FIG. 3, the durations when the first phase signal Ø1A is high do not overlap with the durations when the second phase signal Ø1B is high. In other words, the first phase signal Ø1A and the second phase signal Ø1B are not high at the same time.

The first switch SW1 and the third switch SW3 are turned on/off based on the voltage level of the first phase signal Ø1A. In the present embodiment, the first switch SW1 and the third switch SW3 are turned on while the first phase signal Ø1A is high, and the first switch SW1 and the third switch SW3 are turned off while the first phase signal Ø1A is low. However, the invention is not limited thereto. For example, in another embodiment of the present invention, the first switch SW1 and the third switch SW3 are turned on while the first phase signal Ø1A is low, and the first switch SW1 and the third switch SW3 are turned off while the first phase signal Ø1A is high.

Moreover, the second switch SW2 and the fourth switch SW4 are turned on/off based on the voltage level of the second phase signal Ø1B. In the present embodiment, the second switch SW2 and the fourth switch SW4 are turned on while the second phase signal Ø1B is high, and second switch SW2 and the fourth switch SW4 are turned off while the second phase signal Ø1B is low. However, the invention is not limited thereto. For example, in another embodiment of the present invention, the second switch SW2 and the fourth switch SW4 are turned on while the second phase signal Ø1B is low, and second switch SW2 and the fourth switch SW4 are turned off while the second phase signal Ø1B is high.

The first end 32 of the first switch SW1 is coupled to a first reference voltage VR1, and the second end 34 of the first switch SW1 is coupled to the panel capacitor Cp. Additionally, the first end 36 of the second switch SW2 is coupled to the panel capacitor Cp and the second end 34 of the first switch SW1. The second end 38 of the second switch SW2 is coupled to the fourth switch SW4. The first switch SW1 and the second switch SW2 are not turned on at the same time. In detail, on the one hand, when the first switch SW1 is turned on, the second switch SW2 is turned off, such that the panel capacitor Cp is charged by the first reference voltage VR1. On the other hand, when the second switch SW2 is turned on, the first switch SW1 is turned off, such that the panel capacitor Cp is discharged. Therefore, the panel capacitor Cp is charged and discharged cyclically according to the first phase signal Ø1A and the second phase signal Ø1B.

Similarly, the first end 42 of the third switch SW3 is coupled to a second reference voltage VR2, and the second end 44 of the third switch SW3 is coupled to the first capacitor Ca. Additionally, the first end 46 of the fourth switch SW4 is coupled to the first capacitor Ca and the second end 44 of the third switch SW3, and the second end 48 of the fourth switch SW4 is coupled to the second end 38 of the second switch SW2. The third switch SW3 and the fourth switch SW4 are not turned on at the same time. In detail, on the one hand, when the third switch SW3 is turned on, the fourth switch SW4 is turned off, such that the first capacitor Ca is charged by the second reference voltage VR2. On the other hand, when the fourth switch SW4 is turned on, the third switch SW3 is turned off, such that the first capacitor Ca is discharged. Therefore, the first capacitor Ca is charged and discharged cyclically according to the first phase signal Ø1A and the second phase signal Ø1B.

Because the first switch SW1 and the third switch SW3 are turned on/off based on the voltage level of the first phase signal Ø1A, the panel capacitor Cp and the first capacitor Ca are charged by the first reference voltage VR1 and the second reference voltage VR2 respectively at the same time. Moreover, because the second switch SW2 and the fourth switch SW4 are turned on/off based on the voltage level of the second phase signal Ø1B, the panel capacitor Cp and the first capacitor Ca are discharged at the same time.

The touch panel 100 further comprises a control circuit 60. One of the input terminals of the control circuit 60 is coupled to the second end 38 of the second switch SW2 and the second end 48 of the fourth switch SW4. The control circuit 60 generates a third phase signal Ø2A' and a fourth phase signal Ø2B' based on a third reference voltage VR3 and the voltage level $V_O$ of the second end 38 of the second switch SW2. The third phase signal Ø2A' and the fourth phase signal Ø2B' are applied to the fifth switch SW5 and the sixth switch SW6 respectively, such that the fifth switch SW5 and the sixth switch SW6 are turned on/off based on the third phase signal Ø2A' and the fourth phase signal Ø2B'. The fifth switch SW5 and the sixth switch SW6 are not turned on at the same time. In detail, in the present embodiment, on the one hand, when the fifth switch SW5 is turned on, the sixth switch SW6 is turned off, such that the second capacitor Cb is charged by the second reference voltage VR2. On the other hand, when the sixth switch SW6 is turned on, the fifth switch SW5 is turned off, such that the second capacitor Cb is discharged. Therefore, the second capacitor Cb is charged and discharged according to the third phase signal Ø2A' and the fourth phase signal Ø2B'.

The first reference voltage VR1, the second reference voltage VR2, and the third reference voltage VR3 are adjustable. In an embodiment of the present invention, the relationship among the three reference voltages VR1, VR2, and VR3 is represented as follows:

$$K \times (VR1 - VR3) = N \times (VR3 - VR2) \qquad (1)$$

Where each of the parameters K and N could be any real number.

In an embodiment of the present invention, the parameters K and N are 1. The first reference voltage VR1 is 1 volt, the second reference voltage VR2 is 3 volts, and the third reference voltage VR3 is 2 volts. However, the present invention is not limited thereto. When the fifth switch SW5 and the sixth switch SW6 are turned off and stop operating, the voltage level $V_O$ of the second end 38 of the second switch SW2 is determined based on the capacitances of the panel capacitor Cp and the first capacitor Ca. That is, $$V_o = \frac{VR1 \times Cp + VR2 \times Ca}{Cp + Ca} \qquad (2)$$

$$= \frac{Cp + 3 \times Ca}{Cp + Ca} \text{(volts)}$$

According to the equation (2), when the capacitance of the panel capacitor Cp is equal to that of the first capacitor Ca, the voltage level $V_O$ would be equal to 2 volts (i.e. the third reference voltage VR3). Moreover, the voltage level $V_O$ would be greater than 2 volts when the capacitance of the panel capacitor Cp is less than that of the first capacitor Ca, and the voltage level $V_O$ would be less than 2 volts when the capacitance of the panel capacitor Cp is greater than that of the first capacitor Ca.

The control circuit 60 generates the third phase signal Ø2A' and the fourth phase signal Ø2B' based on the voltage level $V_O$ and the third reference voltage VR3 to control the operations of the fifth switch SW5 and the sixth switch SW6. In detail, when the voltage level $V_O$ is less than the third reference voltage VR3, and once the control circuit 60 detects one of the rising edges of the first phase signal Ø1A, the control circuit 60 generates a corresponding one pulse of the third phase signal Ø2A'. Due to the generation of each pulse of the third phase signal Ø2A', the control circuit 60 generates a corresponding pulse of the fourth phase signal Ø2B' when the next rising edge of the second phase signal Ø1B is detected.

Similarly, when the voltage level $V_O$ is greater than the third reference voltage VR3, and when the control circuit 60 detects the rising edge of the first phase signal Ø1A, the control circuit 60 makes the voltage level of the third phase signal Ø2A' be at low. Due to the low level of the third phase signal Ø2A', the control circuit 60 makes the voltage level of the fourth phase signal Ø2B' be at low when the next rising edge of the second phase signal Ø1B is detected.

In an embodiment of the present invention, the control circuit 60 counts the number $N_C$ of the pulses of the third phase signal Ø2A' within a predetermined period (e.g. 1 ms). The control circuit 60 selects the first capacitor Ca from the capacitors $C_1$-$C_N$ according to the number $N_C$, and the capacitance of the selected first capacitor Ca is less than that of the panel capacitor Cp. Since the capacitance of the selected first capacitor Ca is less than that of the panel capacitor Cp, the voltage level $V_O$ tends to be less than the third reference voltage VR3. In order to make the voltage level $V_O$ to match the third reference voltage VR3, the second capacitor Cb, the fifth switch SW5, and the sixth switch SW6 are used to compensate the difference between the voltage level $V_O$ and the third reference voltage VR3. For example, in an embodiment of the present invention, the capacitance of the panel capacitor Cp is equal to 20.5 pF, the capacitance of the first capacitor Ca is 20 pF, and the capacitance of the second capacitor is 1 pF. When the touch panel 100 operates, the control circuit 60 turns on/off the fifth switch SW5 and the sixth switch SW6 at right moments, such that the voltage level $V_O$ swings around the third reference voltage VR3, as shown in FIG. 3. In detail, when the control circuit 60 detects that the voltage level $V_O$ is less than the third reference voltage VR3, the control circuit 60 will turn on the fifth switch SW5 and the sixth switch SW6 successively to pull up the voltage level $V_O$. When the control circuit 60 detects that the voltage level $V_O$ is greater than the third reference voltage VR3, the control circuit 60 will turn off the fifth switch SW5 and the sixth switch SW6 successively to pull down the voltage level $V_O$.

The frequency of turning on the fifth switch SW5 and the sixth switch SW6 is associated with the difference between the capacitance of the panel capacitor Cp and the capacitance of the first capacitor Ca. For example, in the present embodiment, the difference between the capacitance of the panel capacitor Cp and the capacitance of the first capacitor Ca is equal to 0.5 (i.e. 20.5-20) pF, and the capacitance of the second capacitor Cb is equal to 1 pF, such that the ratio of the difference between Cp and Ca to the capacitance of the second capacitor Cb is equal to 0.5 (i.e. 0.5/1). The control circuit 60 is configured to control a ratio of the number of the pulses of the third phase signal Ø2A' (or the fourth phase signal Ø2B') within a predetermined time period to the number of the pulses of the first phase signal Ø1A (or the second phase signal Ø1B) within the predetermined time period to be equal to 0.5 (i.e. the ratio of the difference between Cp and Ca to the capacitance of the second capacitor Cb). For instance, as shown in FIG. 3, five pulses of the third phase signal Ø2A' and five pulses of the fourth phase signal Ø2B' are generated while ten pulses of the first phase signal Ø1A and ten pulses of the second phase signal Ø1B are generated. Therefore, the pulse ratio is 0.5 (i.e. 5/10), which is equal to the ratio of the difference between Cp and Ca to the capacitance of the second capacitor Cb.

Figure 4:
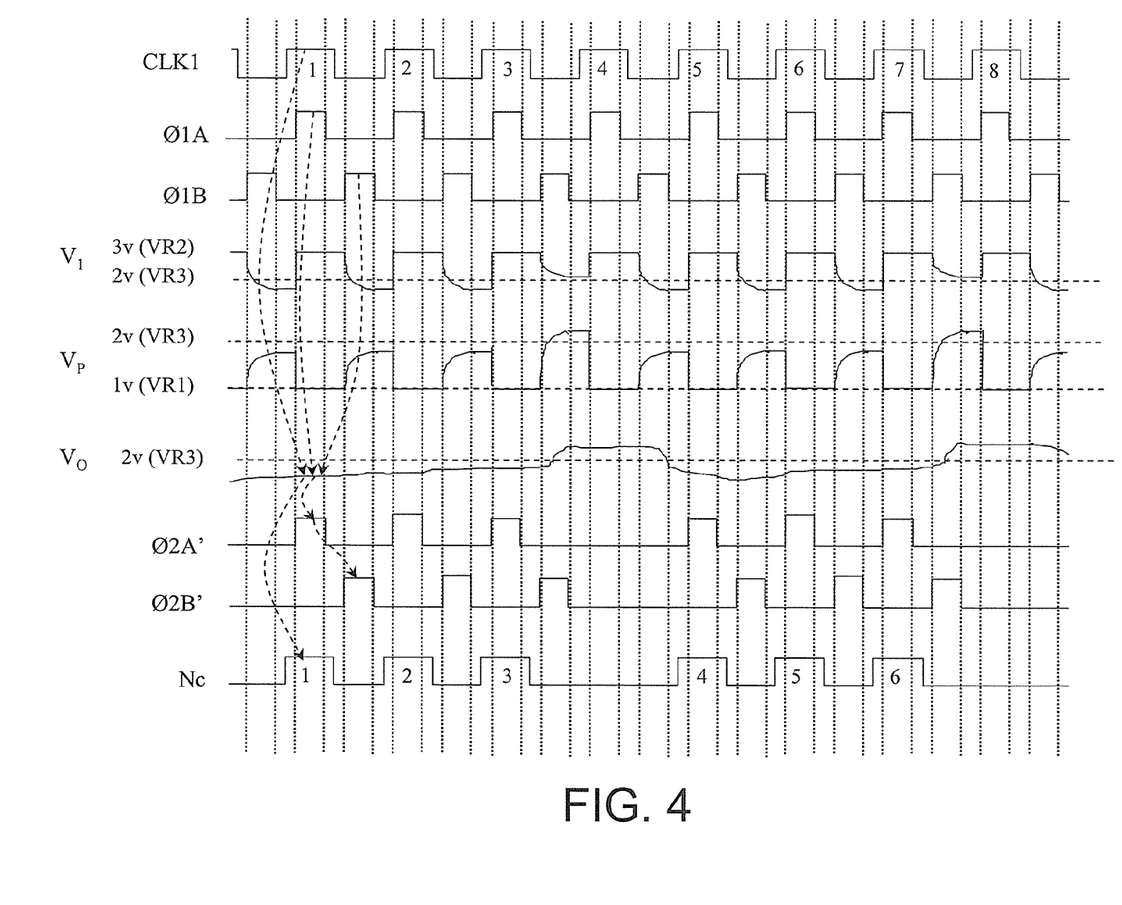
FIG. 4 is a timing diagram of signals of the touch panel shown in FIG. 2 while the capacitance of the panel capacitor Cp is 20.75 pF.

Referring to FIG. 4, FIG. 4 is a timing diagram of signals of the touch panel 100 while the capacitance of the panel capacitor Cp is changed to be 20.75 pF. The capacitance of the first capacitor Ca is still 20 pF, and the capacitance of the second capacitor Cb is still 1 pF. Therefore, in the embodiment, the ratio of the difference between Cp and Ca to the capacitance of the second capacitor Cb is 0.75 (i.e. 0.75/1). Moreover, as shown in FIG. 4, six pulses of the third phase signal Ø2A' and six pulses of the fourth phase signal Ø2B' are generated while eight pulses of the first phase signal Ø1A and eight pulses of the second phase signal Ø1B are generated. The ratio of six to eight is 0.75, which is equal to the ratio of the difference between Cp and Ca to the capacitance of the second capacitor Cb.

Figure 5:
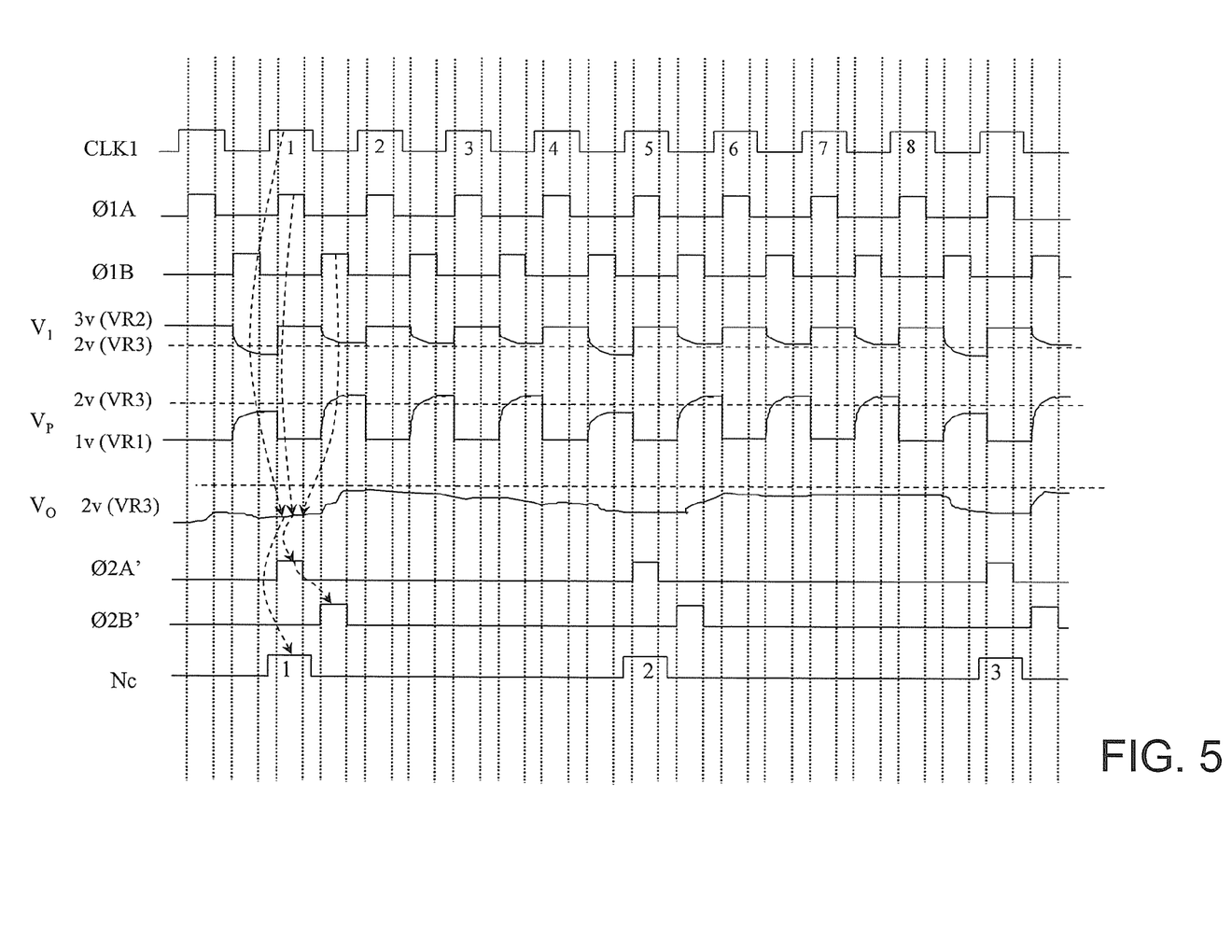
FIG. 5 is a timing diagram of signals of the touch panel shown in FIG. 2 while the capacitance of the panel capacitor Cp is 20.25 pF.

Referring to FIG. 5, FIG. 5 is a timing diagram of signals of the touch panel 100 while the capacitance of the panel capacitor Cp is changed to be 20.25 pF. The capacitance of the first capacitor Ca is still 20 pF, and the capacitance of the second capacitor Cb is still 1 pF. Therefore, in the embodiment, the ratio of the difference between Cp and Ca to the capacitance of the second capacitor Cb is 0.25 (i.e. 0.25/1). Moreover, as shown in FIG. 5, two pulses of the third phase signal Ø2A' and two pulses of the fourth phase signal Ø2B' are generated while eight pulses of the first phase signal Ø1A and eight pulses of the second phase signal Ø1B are generated. The ratio of two to eight is 0.25, which is equal to the ratio of the difference between Cp and Ca to the capacitance of the second capacitor Cb.

In brief, when the voltage level $V_O$ is less than the third reference voltage VR3, the fifth switch SW5 and the sixth switch SW6 are turned on sequentially to pull up the voltage level $V_O$. When the voltage level $V_O$ is greater than the third reference voltage VR3, the control circuit 60 stops turning on the fifth switch SW5 and the sixth switch SW6 until the voltage level $V_O$ is less than the third reference voltage VR3. Therefore, the control circuit 60 compensates the difference between the voltage level $V_O$ and the third reference voltage VR3 by using the fifth SW5 and the sixth switch SW6.

Since the ratio of the number of the pulses of the third phase signal Ø2A' (or the fourth phase signal Ø2B') within the predetermined time period to the number of the pulses of the first phase signal Ø1A (or the second phase signal Ø1B) within the predetermined time period is equal to the ratio of the difference between Cp and Ca to the capacitance of the second capacitor Cb, the capacitance of the panel capacitor Cp could be determined accordingly as follows:

$$Cp=C1+C2\times R \qquad (3)$$

Where, R is the ratio of the number of the pulses of the third phase signal Ø2A' (or the fourth phase signal Ø2B') within the predetermined time period to the number of the pulses of the first phase signal Ø1A (or the second phase signal Ø1B) within the predetermined time period.

For example, when the ratio R is equal to 0.5, as shown in FIG. 3, the capacitance of the panel capacitor Cp is equal to (Ca+Cb×0.5). As shown in FIG. 4, when the ratio R is equal to 0.75, the capacitance of the panel capacitor Cp is equal to (Ca+Cb×0.75). As shown in FIG. 5, when the ratio R is equal to 0.25, the capacitance of the panel capacitor Cp is equal to (Ca+Cb×0.25). If the ratio is equal to 1, it means that the capacitance of the panel capacitor Cp may be greater than or equal to (Ca+Cb), such that the control circuit 60 selects another capacitor with greater capacitance from the capacitors $C_1$-$C_N$ to replace the original first capacitor Ca. For example, when the capacitance of the panel capacitor Cp is 21.25 pF, which is greater than the sum of the capacitances of the first capacitor Ca (20 pF) and the second capacitor Cb (1 pF), $N_C$ would be equal to the predetermined number, such that the signal processor 96 of the control circuit 60 selects another capacitor with its capacitance of 21 pF from the capacitors $C_1$-$C_N$ to replace the original capacitor Ca. Therefore, the panel capacitor Cp will be less than (Ca+Cb) but greater than Ca, i.e. Ca<Cp<(Ca+Cb).

Figure 6:
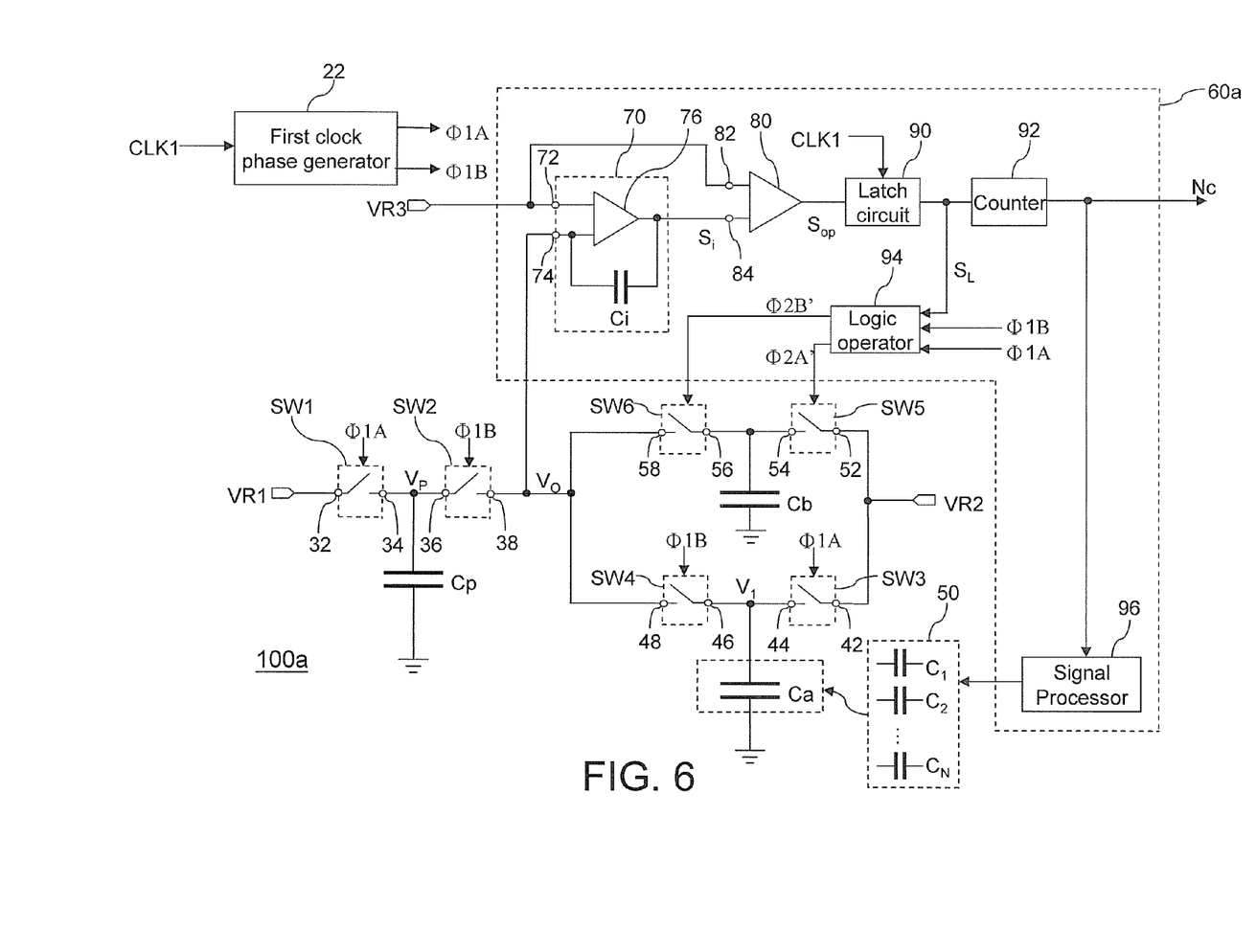
FIG. 6 is a functional block diagram of a touch panel according to an embodiment of the present invention.

FIG. 6 is a functional block diagram of a touch panel 100a according to an embodiment of the present invention. The touch panel 100a is similar to the touch panel 100 show in FIG. 2. The touch panel 100a also comprises the panel capacitor Cp, the first capacitor Ca, the second capacitor Cb, the first clock phase generator 22, the six switches SW1-SW6, and a control circuit 60a. The connections and functions of the panel capacitor Cp, the first capacitor Ca, the second capacitor Cb, the first clock phase generator 22, and the six switches SW1-SW6 of the touch panel 100a are the same as those of the panel capacitor Cp, the first capacitor Ca, the second capacitor Cb, the first clock phase generator 22, and the six switches SW1-SW6 of the touch panel 100. The control circuit 60a is used to generate the third phase signal Ø2A' and the fourth phase signal Ø2B' based on the third reference voltage VR3, the voltage level $V_O$, the first phase signal Ø1A, and the second phase signal Ø1B. The control circuit 60a has an integrator 70, an operational amplifier 80, and a latch circuit 90. The integrator 70 outputs an integrated signal $S_i$ based on the third reference voltage VR3 and the voltage level $V_O$ of the second end 38 of the second switch SW2. A first input terminal 72 of the integrator 70 is coupled to the third reference voltage VR3. A second input terminal 74 of the integrator 70 is coupled to the second end 38 of the second switch SW2, the second end 48 of the fourth switch SW4, and the second end 58 of the sixth switch SW6. The integrator 70 has an operational amplifier 76 and an integration capacitor Ci. The two input terminals of the operational amplifier 76 are respectively coupled to the first input terminal 72 and the second input terminal 74 of the integrator 70. The integration capacitor Ci is coupled between the one of the input terminals and the output terminal of the operational amplifier 76.

Figure 7:
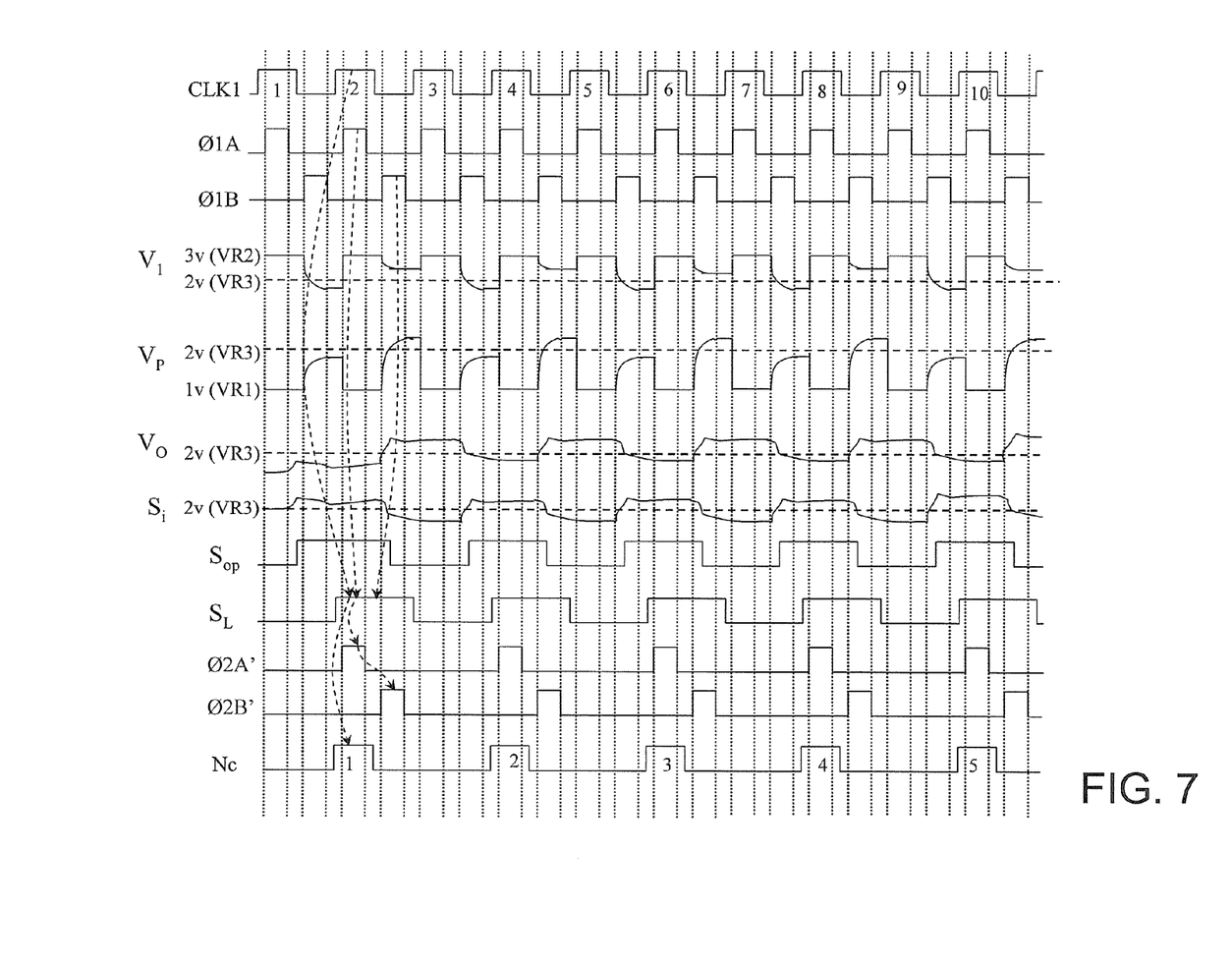
FIG. 7 is a timing diagram of signals of the touch panel shown in FIG. 6 while the capacitance of the panel capacitor Cp is 20.5 pF.

FIG. 7 is a timing diagram of the signals of the touch panel 100a. Referring to FIG. 6-7, when the voltage level $V_O$ is less than the third reference voltage VR3, the voltage level of the integrated signal $S_i$ is greater than the third reference voltage VR3. When the voltage level $V_O$ is greater than the third reference voltage VR3, the voltage level of the integrated signal $S_i$ is less than the third reference voltage VR3.

The operational amplifier 80 compares the third voltage VR3 with the integrated signal $S_i$ so as to output an amplified signal $S_{OP}$. The first input terminal 82 of the operational amplifier 80 is coupled to the third reference voltage VR3, and the second input terminal 84 of the operational amplifier 80 is coupled to the output terminal of the integrator 70. When the integrated signal $S_i$ is greater than the third reference voltage VR3, the amplified signal $S_{OP}$ is low. When the integrated signal $S_i$ is less than the third reference voltage VR3, the amplified signal $S_{OP}$ is high.

The latch circuit 90 is coupled to the output terminal of the operational amplifier 80. The latch circuit 90 latches the amplified signal $S_{OP}$ according to the first clock signal CLK1 so as to output the latched signal $S_L$ to the logic operator 94. In detail, the latched signal $S_L$ is pulled up to be high when the amplified signal $S_{OP}$ is high and a rising edge of the first clock signal CLK1 is detected. And, the latched signal $S_L$ is pulled down to be low when the amplified signal $S_{OP}$ is low and a rising edge of the first clock signal CLK1 is detected.

The control circuit 60a further comprises a counter 92. The counter 92 counts the number $N_C$ of the pulses of the latched signal $S_L$ within the predetermined period, and the touch panel 110a calculates the capacitance of the panel capacitor Cp according to the number $N_C$. In one embodiment of the present invention, the counter 92 counts the number $N_C$ of the pulses of the latched signal $S_L$ according to the first clock signal CLK1. Within every period of the pulses of the first clock signal CLK1 of a predetermined number, the counter 92 resets and then recounts the number $N_C$. The aforesaid predetermined number is a positive integer, and the period of the pulses of the first clock signal CLK1 of a predetermined number is equal to the predetermined period. The counted number of the counter 92 is increased by 1 when a rising edge of the first clock signal CLK1 is detected while the latched signal $S_L$ is high.

The control circuit 60a further comprises a logic operator 94. The logic operator 94 generates the third phase signal Ø2A' and the fourth phase signal Ø2B' according to the first phase signal Ø1A, the second phase signal Ø1B, and the latched signal $S_L$. In detail, when the latched signal $S_L$ is high, and first phase signal Ø1A is high, the third phase signal Ø2A' is high. When the latched signal $S_L$ is high, and second phase signal Ø1B is high, the fourth phase signal Ø2B' is high.

The control circuit 60a is capable of selecting a capacitor having proper capacitance from the capacitors $C_1$-$C_N$ to replace the original first capacitor Ca according to the latched signal $S_L$. On the one hand, if the latched signal $S_L$ is high each time the rising edge of the first clock signal CLK1 is detected, it means that the capacitance of the panel capacitor Cp may be greater than or equal to (Ca+Cb), such that the control circuit 60a selects another capacitor with greater capacitance from the capacitors $C_1$-$C_N$ to replace the original first capacitor Ca. On the other hand, if the latched signal $S_L$ is low each time the rising edge of the first clock signal CLK1 is detected, it means that the capacitance of the panel capacitor Cp may be less than or equal to Ca, such that the control circuit 60a selects another capacitor with less capacitance from the capacitors $C_1$-$C_N$ to replace the original first capacitor Ca.

The control circuit 60a further comprises a signal processor 96. The signal processor 96 selects a capacitor from a plurality of capacitors as the first capacitor Ca according to the number $N_C$. For example, if the number $N_C$ is equal to of the predetermined number, it means that the latched signal $S_L$ is high each time the rising edge of the first clock signal CLK1 is detected within the aforesaid predetermined period, such that the control circuit 60a selects another capacitor with greater capacitance from the capacitors $C_1$-$C_N$ to replace the original first capacitor Ca. For instance, when the capacitance of the panel capacitor Cp is 21.25 pF, which is greater than the sum of the capacitances of the first capacitor Ca (20 pF) and the second capacitor Cb (1 pF), $N_C$ would be equal to the predetermined number, such that the signal processor 96 of the control circuit 60a selects another capacitor with its capacitance of 21 pF from the capacitors $C_1$-$C_N$ to replace the original capacitor Ca. Moreover, if the number $N_C$ is zero, it means that the latched signal $S_L$ is low each time the rising edge of the first clock signal CLK1 is detected within the aforesaid predetermined period, such that, the control circuit 60a selects another capacitor with less capacitance from the capacitors $C_1$-$C_N$ to replace the original first capacitor Ca. For instance, when the capacitance of the panel capacitor Cp is 19.5 pF, which is less than that of the first capacitor Ca (20 pF), $N_C$ would be equal to zero, such that the signal processor 96 of the control circuit 60a selects another capacitor with its capacitance of 19 pF from the capacitors $C_1$-$C_N$ to replace the original capacitor Ca.

Figure 8:
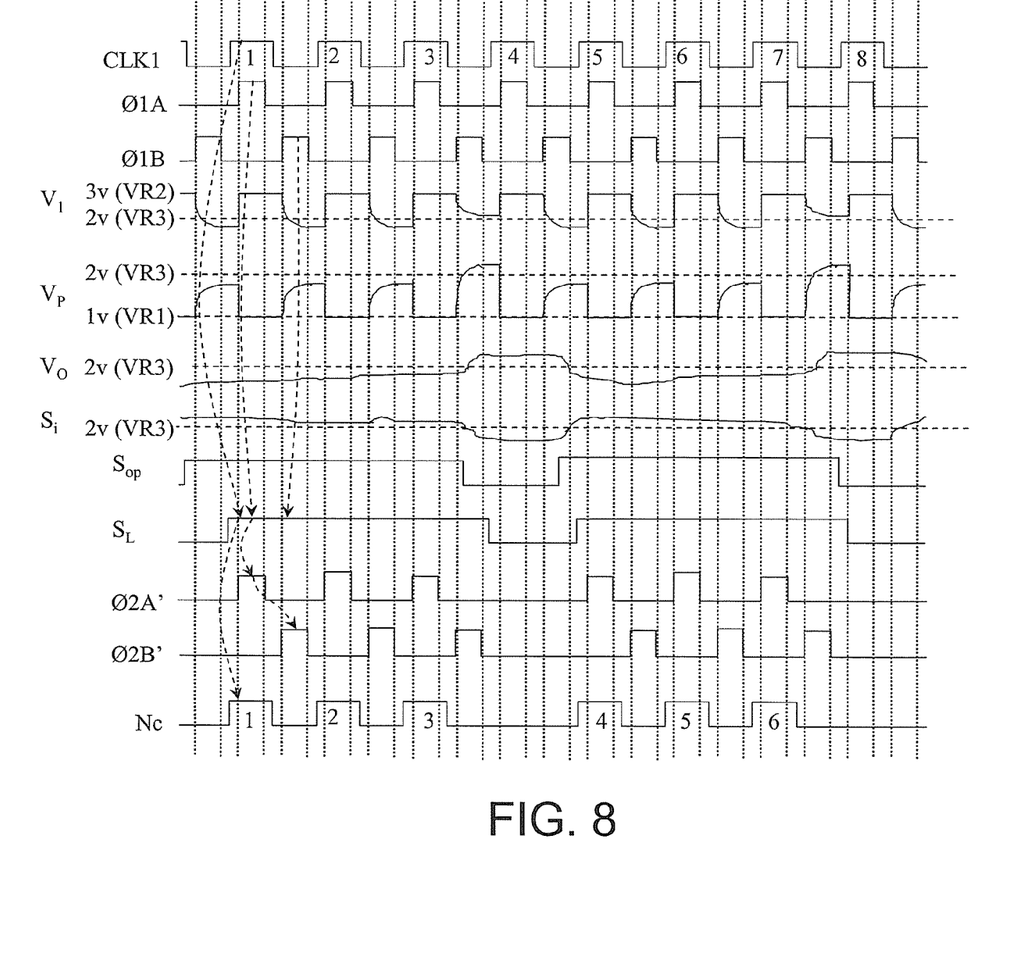
FIG. 8 is a timing diagram of signals of the touch panel shown in FIG. 6 while the capacitance of the panel capacitor Cp is 20.75 pF.
Figure 9:
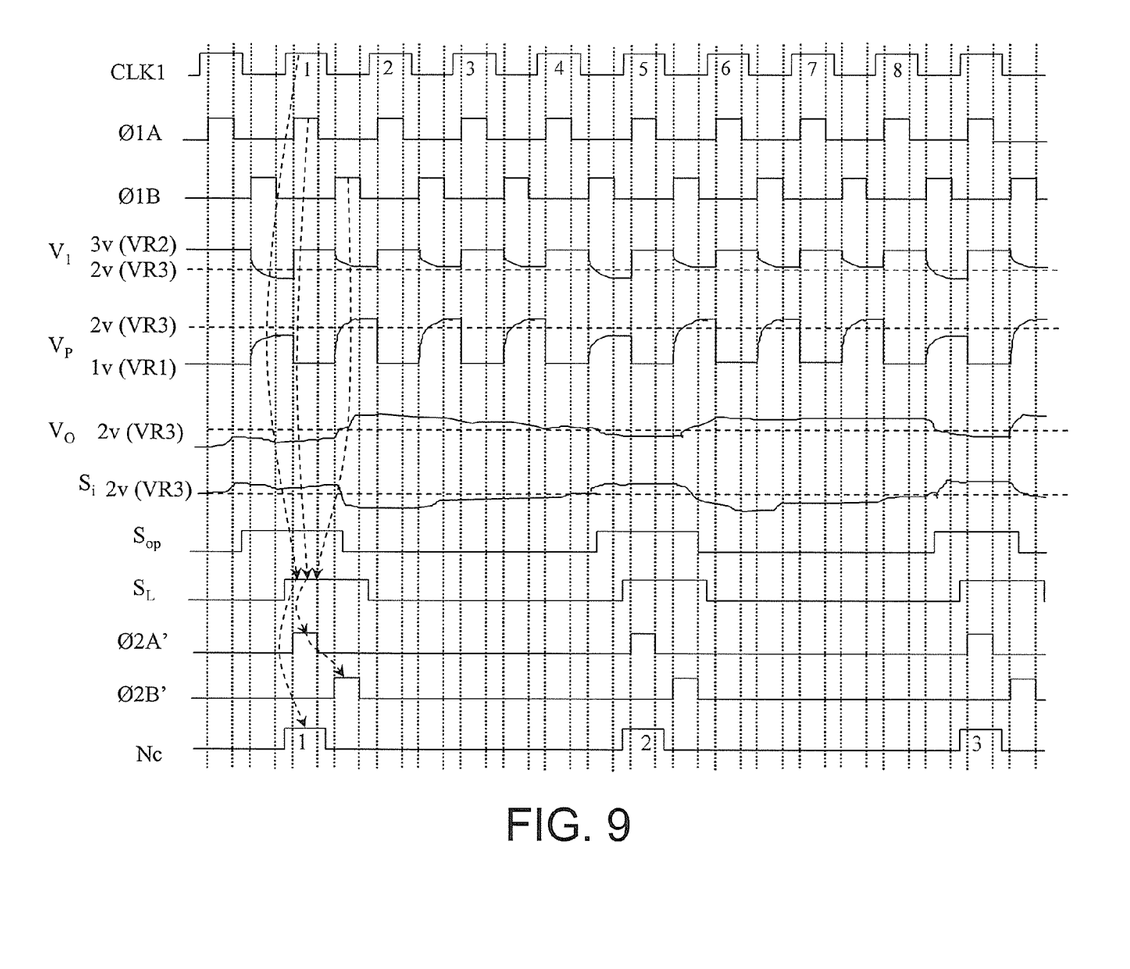
FIG. 9 is a timing diagram of signals of the touch panel shown in FIG. 6 while the capacitance of the panel capacitor Cp is 20.25 pF.

In the embodiment of FIG. 6, the capacitance of the panel capacitor Cp of the touch panel 100a could be also determined according to the equation (3). FIGS. 7-9 are timing diagrams of signals of the touch panel 100a while the capacitance of the panel capacitor Cp is 20.5 pF, 20.75 pF, and 20.25 pF respectively.

Figure 10:
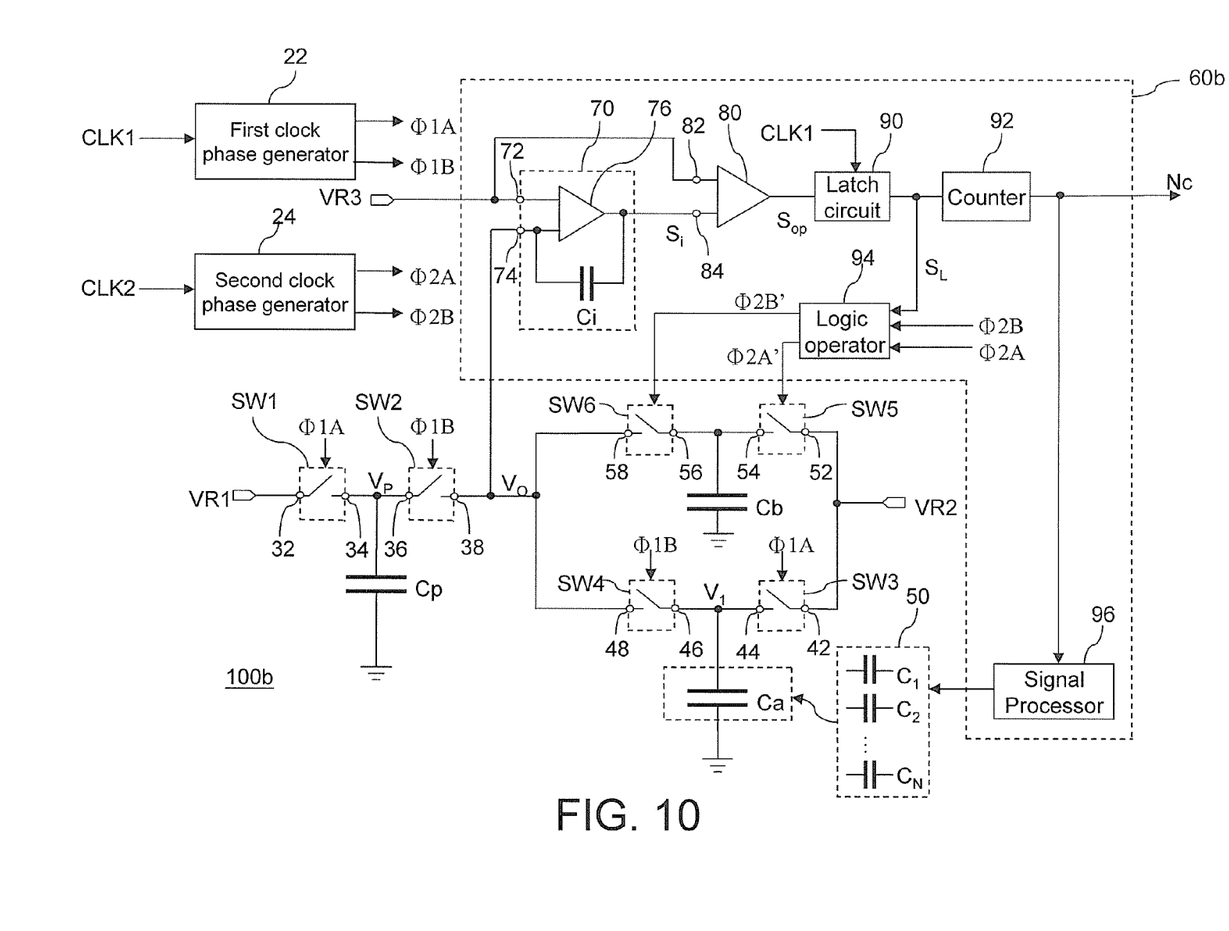
FIG. 10 is a functional block diagram of a touch panel of an embodiment of the present invention.
Figure 11:
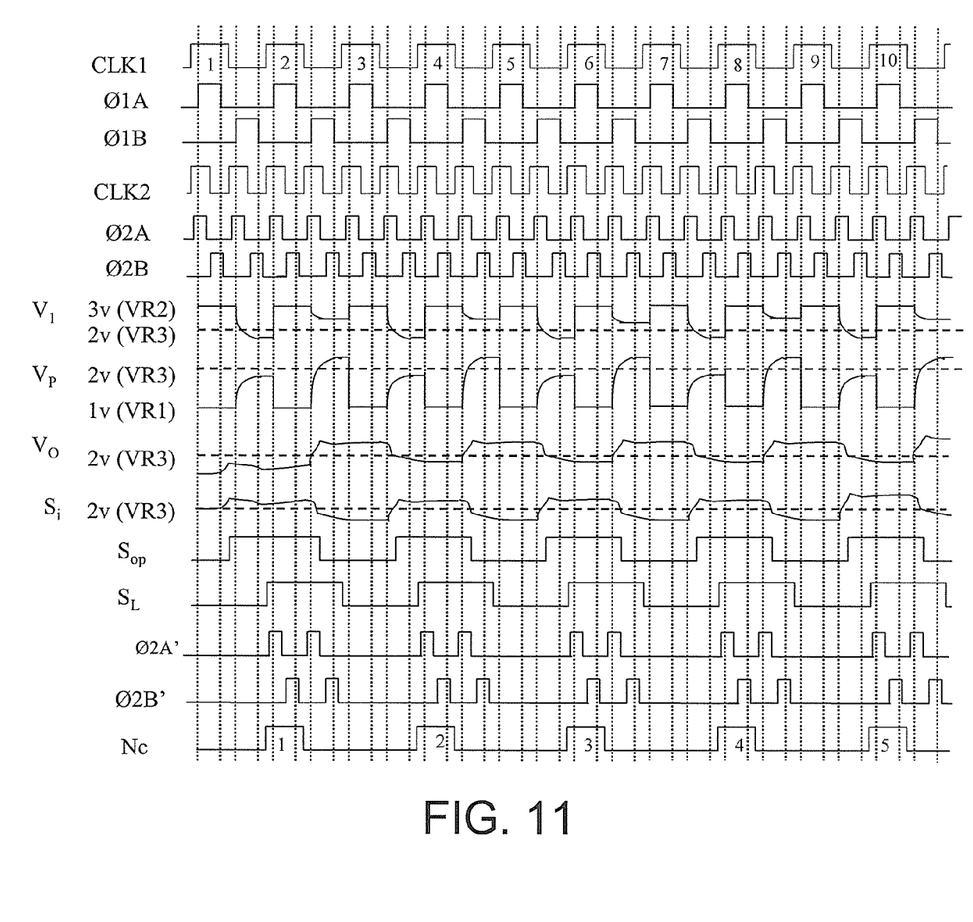
FIG. 11 is a timing diagram of signals of the touch panel shown in FIG. 10 while the capacitance of the panel capacitor Cp is 20.5 pF.

FIG. 10 is a functional block diagram of a touch panel 100b of an embodiment of the present invention. The touch panel 100b is similar to the touch panel 100a. The touch panel 100b also comprises the panel capacitor Cp, the first capacitor Ca, the second capacitor Cb, the first clock phase generator 22, the six switches SW1-SW6, and a control circuit 60a. The connections and functions of the panel capacitor Cp, the first capacitor Ca, the second capacitor Cb, the first clock phase generator 22, and the six switches SW1-SW6 of the touch panel 100b are the same as those of the panel capacitor Cp, the first capacitor Ca, the second capacitor Cb, the first clock phase generator 22, and the six switches SW1-SW6 of the touch panel 100a. The major difference between the touch panel 100a and the touch panel 100b is that the touch panel 100b further comprises a second clock phase generator 24. The second clock phase generator 24 generates a fifth phase signal Ø2A and a sixth phase signal Ø2B according to a second clock signal CLK2. When the fifth phase signal Ø2A is at a first state (e.g. a high-voltage state), the sixth phase signal Ø2B is at a second state (e.g. a low-voltage state). When the sixth phase signal Ø2B is at the first state, the fifth phase signal Ø2A is at the second state. The logic operator 94 generates the third phase signal Ø2A' and the fourth phase signal Ø2B' according to the fifth phase signal Ø2A, the sixth phase signal Ø2B, and the latched signal $S_L$. In the present embodiment, the frequency of the second clock signal CLK2 is N times of a frequency of the first clock signal CLK1, where N is an integer. For example, when N is equal to 2, the timing diagram of the signals of the touch panel 100b is represented in FIG. 11.

The second capacitor Cb is also used to compensate the difference between the voltage level $V_O$ and the third reference voltage VR3. Since the fifth switch SW5 and the sixth switch SW6 are turned on/off sequentially based on the third phase signal Ø2A' and the fourth phase signal Ø2B', the second capacitor Cb is charged and discharged at right moments, such that the voltage level $V_O$ swings around the third reference voltage VR3.

When the integrated signal $S_i$ is greater than the third reference voltage VR3, the amplified signal $S_{OP}$ is low. When the integrated signal $S_i$ is less than the third reference voltage VR3, the amplified signal $S_{OP}$ is high. The latch circuit 90 also latches the amplified signal $S_{OP}$ according to the first clock signal CLK1 so as to output the latched signal $S_L$ to the logic operator 94. In detail, the latched signal $S_L$ is pulled up to be high when the amplified signal $S_{OP}$ is high and a rising edge of the first clock signal CLK1 is detected. And, the latched signal $S_L$ is pulled down to be low when the amplified signal $S_{OP}$ is low and a rising edge of the first clock signal CLK1 is detected. The counter 92 counts the number $N_C$ of the pulses of the latched signal $S_L$ within a predetermined period based on the first clock signal CLK1.

The voltage level of the third phase signal Ø2A' is high only when the latched signal $S_L$ is high and when the fifth phase signal Ø2A is high. The voltage level of the fourth phase signal Ø2B' is high only when the latched signal $S_L$ is high and when the sixth phase signal Ø2B is high. When the third phase signal Ø2A' is high, the fifth switch SW5 is turned on. When the sixth phase signal Ø2B is high, the sixth switch SW6 is turned on. Therefore, the second capacitor Cb is charged and discharged repeatedly.

In summary, the fifth switch and the sixth switch would be turned on/off at the right moments. Accordingly, the difference between the capacitance of the panel capacitor and that of the first capacitor could be determined accurately according to the capacitance of the second capacitor and the number of the pulses of the latched signal within the predetermined period.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
a first clock phase generator, generating a first phase signal and a second phase signal according to a first clock signal;
a panel capacitor;
a first capacitor;
a second capacitor;
a first switch, turned on/off based on a voltage level of the first phase signal, wherein a first end of the first switch is coupled to a first reference voltage, and a second end of the first switch is coupled to the panel capacitor;
a second switch, turned on/off based on a voltage level of the second phase signal, wherein a first end of the second switch is coupled to the panel capacitor;
a third switch, turned on/off based on the voltage level of the first phase signal, wherein a first end of the third switch is coupled to a second reference voltage, and a second end of the third switch is coupled to the first capacitor;
a fourth switch, turned on/off based on the voltage level of the second phase signal, wherein a first end of the fourth switch is coupled to the first capacitor, and a second end of the fourth switch is coupled to a second end of the second switch;
a control circuit, coupled to the second end of the second switch and the second end of the fourth switch, wherein the control circuit generates a third phase signal and a fourth phase signal based on a third reference voltage and a voltage level of the second end of the second switch;
a fifth switch, turned on/off based on a voltage level of the third phase signal, wherein a first end of the fifth switch is coupled to the second reference voltage, and a second end of the fifth switch is coupled to the second capacitor; and
a sixth switch, turned on/off based on a voltage level of the fourth phase signal, wherein a first end of the sixth switch is coupled to the second capacitor, and a second end of the sixth switch is coupled to the second end of the second switch and the second end of the fourth switch.

2. The touch panel as claimed in claim 1, wherein when the first phase signal is at a first state, the second phase signal is at a second state, and when the second phase signal is at the first state, the first phase signal is at the second state,
wherein when the third phase signal is at the first state, the fourth phase signal is at the second state, and when the fourth phase signal is at the first state, the third phase signal is at the second state.

3. The touch panel as claimed in claim 1, wherein the control circuit comprises a logic operator, the logic operator generates the third phase signal and the fourth phase signal according to the first phase signal, the second phase signal, and a latched signal.

4. The touch panel as claimed in claim 3, wherein the control circuit further comprises:
- an integrator, outputting an integrated signal based on the third reference voltage and the voltage level of the second end of the second switch, wherein a first input terminal of the integrator is coupled to the third reference voltage, and a second input terminal of the integrator is coupled to the second end of the second switch, the second end of the fourth switch, and the second end of the sixth switch;
- an operational amplifier, comparing the third voltage with the integrated signal so as to output an amplified signal, wherein a first input terminal of the operational amplifier is coupled to the third reference voltage, and a second input terminal of the operational amplifier is coupled to an output terminal of the integrator; and
- a latch circuit, coupled to an output terminal of the operational amplifier, wherein the latch circuit latches the amplified signal according to the first clock signal so as to output the latched signal to the logic operator.

5. The touch panel as claimed in claim 4, wherein the control circuit further comprises a counter, the counter counts a number of pulses of the latched signal within a predetermined period, and the touch panel calculates the capacitance of the panel capacitor according to the number.

6. The touch panel as claimed in claim 5, wherein the control circuit further comprises a signal processor, the signal processor selects a capacitor from a plurality of capacitors as the first capacitor based on the number.

7. The touch panel as claimed in claim 4, wherein a voltage level of the integrated signal is greater than the third reference voltage when the voltage level of the second end of the second switch is less than the third reference voltage, and the voltage level of the integrated signal is less than the third reference voltage when the voltage level of the second end of the second switch is greater than the third reference voltage.

8. The touch panel as claimed in claim 3, wherein the latched signal is at a first state when the voltage level of the second end of the second switch is less than the third reference voltage, and the latched signal is at a second state when the voltage level of the second end of the second switch is greater than the third reference voltage.

9. The touch panel as claimed in claim 8, wherein when the latched signal is at the second state, the fifth switch and the sixth switch are turned off.

10. The touch panel as claimed in claim 8, wherein only when the latched signal is at the first state, the fifth switch could be turned on by the third phase signal, and the sixth switch could be turned on by the fourth phase signal.

11. The touch panel as claimed in claim 1, further comprising:
- a second clock phase generator, generating a fifth phase signal and a sixth phase signal according to a second clock signal, wherein when the fifth phase signal is at a first state, the sixth phase signal is at a second state, and when the sixth phase signal is at the first state, the fifth phase signal is at the second state,
- wherein the control circuit comprises a logic operator, the logic operator generates the third phase signal and the fourth phase signal according to the fifth phase signal, the sixth phase signal, and a latched signal.

12. The touch panel as claimed in claim 11, wherein a frequency of the second clock signal is N times of a frequency of the first clock signal, where N is an integer.

13. The touch panel as claimed in claim 11, wherein the control circuit further comprises:
- an integrator, outputting an integrated signal based on the third reference voltage and the voltage level of the second end of the second switch, wherein a first input terminal of the integrator is coupled to the third reference voltage, and a second input terminal of the integrator is coupled to the second end of the second switch, the second end of the fourth switch, and the second end of the sixth switch;
- an operational amplifier, comparing the third voltage with the integrated signal so as to output an amplified signal, wherein a first input terminal of the operational amplifier is coupled to the third reference voltage, and a second input terminal of the operational amplifier is coupled to an output terminal of the integrator; and
- a latch circuit, coupled to an output terminal of the operational amplifier, wherein the latch circuit latches the amplified signal according to the first clock signal so as to output the latched signal to the logic operator.

14. The touch panel as claimed in claim 13, wherein the control circuit further comprises a counter, the counter counts a number of pulses of the latched signal within a predetermined period, and the touch panel calculates the capacitance of the panel capacitor according to the number.

15. The touch panel as claimed in claim 14, wherein the control circuit further comprises a signal processor, the signal processor selects a capacitor from a plurality of capacitors as the first capacitor based on the number.

16. The touch panel as claimed in claim 13, wherein a voltage level of the integrated signal is greater than the third reference voltage when the voltage level of the second end of the second switch is less than the third reference voltage, and the voltage level of the integrated signal is less than the third reference voltage when the voltage level of the second end of the second switch is greater than the third reference voltage.

17. The touch panel as claimed in claim 11, wherein the latched signal is at a first state when the voltage level of the second end of the second switch is less than the third reference voltage, and the latched signal is at a second state when the voltage level of the second end of the second switch is greater than the third reference voltage.

18. The touch panel as claimed in claim 17, wherein when the latched signal is at the second state, the fifth switch and the sixth switch are turned off.

19. The touch panel as claimed in claim 17, wherein only when the latched signal is at the first state, the fifth switch could be turned on by the third phase signal, and the sixth switch could be turned on by the fourth phase signal.

* * * * *